(12) United States Patent
Hirano

(10) Patent No.: US 11,777,882 B1
(45) Date of Patent: Oct. 3, 2023

(54) NOTIFICATION SOUND PROCESSING FOR PUSH NOTIFICATION

(71) Applicant: ph7, Ltd., Newark, DE (US)

(72) Inventor: Yuusuke Hirano, Mitaka (JP)

(73) Assignee: ph7, Ltd., Newark, DE (US)

( * ) Notice: Subject to any disclaimer, the term of this patent is extended or adjusted under 35 U.S.C. 154(b) by 0 days.

(21) Appl. No.: 17/858,428

(22) Filed: Jul. 6, 2022

(51) Int. Cl.
| | |
|---|---|
| *G06F 15/16* | (2006.01) |
| *H04L 51/10* | (2022.01) |
| *G10L 15/22* | (2006.01) |
| *H04L 67/55* | (2022.01) |
| *G10L 15/30* | (2013.01) |
| *G10L 15/26* | (2006.01) |

(52) U.S. Cl.
CPC .............. *H04L 51/10* (2013.01); *G10L 15/22* (2013.01); *G10L 15/26* (2013.01); *G10L 15/30* (2013.01); *H04L 67/55* (2022.05)

(58) Field of Classification Search
CPC ......... H04L 51/10; H04L 67/55; G10L 15/22; G10L 15/26; G10L 15/30
See application file for complete search history.

(56) References Cited

U.S. PATENT DOCUMENTS

| | | | | |
|---|---|---|---|---|
| 6,954,781 | B2 * | 10/2005 | Bhattacharya .......... | H04M 3/53 709/206 |
| 8,565,713 | B2 * | 10/2013 | Sennett ................. | H04W 4/021 455/404.1 |
| 2002/0057764 | A1 * | 5/2002 | Salvucci ................ | H04M 11/04 379/38 |
| 2014/0337014 | A1 * | 11/2014 | Takayama ............ | G11B 27/031 704/201 |
| 2016/0344865 | A1 * | 11/2016 | Ehlen ................. | H04M 3/42195 |
| 2020/0244809 | A1 * | 7/2020 | Koh ................... | H04M 1/72454 |
| 2021/0210068 | A1 * | 7/2021 | Zhang ..................... | G10L 15/07 |
| 2021/0304743 | A1 * | 9/2021 | Gross ................ | H04M 1/72412 |

* cited by examiner

*Primary Examiner* — Oleg Survillo
(74) *Attorney, Agent, or Firm* — THE WEBB LAW FIRM

(57) ABSTRACT

Provided is a method for processing a sound of a voice message associated with a push notification in a voice-based application on a mobile device. The method includes creating a shared storage area that is different from a default storage area where at least one notification sound is stored in advance when the push notification indicating the arrival of the voice message reaches. The shared storage area is an area that can be accessed by both the process of analyzing payload and the process of reproducing the combined notification sound and voice data. The method further includes downloading voice data of the voice message. Downloading voice data of the voice message downloads the voice data based on a URI by a designated mobile device. The method further includes combining the notification sound with the downloaded voice data. Combining the notification sound with the downloaded voice data combines a notification sound with the beginning of a downloaded voice data. The method further includes storing the combined notification sound and voice data in the shared storage area. The method further includes requesting the designated mobile device to reproduce the combined notification sound and voice data stored in the shared storage area.

15 Claims, 4 Drawing Sheets

NOTIFICATION SOUND PROCESSING FOR PUSH NOTIFICATION

BACKGROUND OF THE INVENTION

Field of the Invention

Embodiments of the invention generally relate to computing, particularly to data processing and push notifications in a chat application specialized for voice messages.

Description of Related Art

Push notifications are used, for example, in-text message chat applications. When a text message arrives, the text message is displayed along with a notification sound. Therefore, a user can know that the text message has arrived and know the text message's content of the text message without opening the chat application.

However, in a chat application specialized for voice messages, it was not possible to play a voice message together with a notification sound when the voice message arrived. This is because the notification sound of the push notification needs to be prepared in advance as an audio file, and the notification sound is selected from the voice files prepared in advance. Therefore, under the current specifications, the only sound that can be played when a push notification arrives is the notification sound. The sound of the voice message just received cannot be included in this notification sound.

In the current state, there is no way for the push notification service providers to instruct the application, running on a user device, to reproduce a voice message when the voice message reaches the user device.

SUMMARY OF THE INVENTION

Embodiments of the invention include a method, computer program product, and system, for displaying theme-based push notifications on a computing device.

According to an embodiment of the invention, a method processing a sound of a voice message associated with a push notification in a voice-based application on a mobile device. The method includes creating a shared storage area that is different from a default storage area where at least one notification sound is stored in advance, when the push notification indicating the arrival of the voice message reaches, wherein the shared storage area is an area that can be accessed by both the process of analyzing payload and the process of reproducing the combined notification sound and voice data. The method further includes downloading voice data of the voice message, wherein downloading voice data of the voice message downloads the voice data based on a URI by a designated mobile device. The method further includes combining the notification sound with the downloaded voice data, wherein combining the notification sound with the downloaded voice data combines a notification sound with the beginning of a downloaded voice data. The method further includes storing the combined notification sound and voice data in the shared storage area. The method further includes requesting the designated mobile device to reproduce the combined notification sound and voice data stored in the shared storage area.

A computer program product, according to an embodiment of the invention, for processing a sound of a voice message associated with a push notification in a voice-based application on a mobile device. The computer program product includes a storage device. The storage device embodies program code that is executable by a processor of a computer to perform a method. The method includes creating a shared storage area that is different from a default storage area where at least one notification sound is stored in advance, when the push notification indicating the arrival of the voice message reaches, wherein the shared storage area is an area that can be accessed by both the process of analyzing payload and the process of reproducing the combined notification sound and voice data. The method further includes downloading voice data of the voice message, wherein downloading voice data of the voice message downloads the voice data based on a URI by a designated mobile device. The method further includes combining the notification sound with the downloaded voice data, wherein combining the notification sound with the downloaded voice data combines a notification sound with the beginning of a downloaded voice data. The method further includes storing the combined notification sound and voice data in the shared storage area. The method further includes requesting the designated mobile device to reproduce the combined notification sound and voice data stored in the shared storage area.

According to another embodiment, a system for processing a sound of a voice message associated with a push notification in a voice-based application on a mobile device, includes one or more computing devices each having one or more processors and one or more tangible storage devices. The one or more storage devices embody a program. The program has a set of program instructions for execution by the one or more processors. The program instructions include instructions for creating a shared storage area that is different from a default storage area where at least one notification sound is stored in advance, when the push notification indicating the arrival of the voice message reaches, wherein the shared storage area is an area that can be accessed by both the process of analyzing payload and the process of reproducing the combined notification sound and voice data. The program instructions further include downloading voice data of the voice message, wherein downloading voice data of the voice message downloads the voice data based on a URI by a designated mobile device. The program instructions further include combining the notification sound with the downloaded voice data, wherein combining the notification sound with the downloaded voice data combines a notification sound with the beginning of a downloaded voice data. The program instructions further include storing the combined notification sound and voice data in the shared storage area. The program instructions further include requesting the designated mobile device to reproduce the combined notification sound and voice data stored in the shared storage area.

DESCRIPTION OF THE INVENTION

Push notifications are a robust and efficient way to propagate short, timely, and relevant information. Push notification service providers (e.g. Apple Push Notification Service (APNS is a registered trademark of Apple, Inc.), Google Cloud Messaging (GCM is a registered trademark of Google, Inc.), Firebase Cloud Messaging (FCM is a registered trademark of Google, Inc.), OneSignal (OneSignal is a registered trademark of OneSignal, Inc.)) initiate and provide the push notifications to computing devices.

Such push notifications are used, for example, in-text message chat applications. When a text message arrives, the text message is displayed along with a notification sound. Therefore, a user can know that the text message has arrived and can know the content of the text message without opening the chat application. However, in a chat application specialized in voice messages, it was not possible to play a voice message together with a notification sound when the voice message arrived. The notification sound of the push notification needs to be prepared in advance as an audio file, and in the specifications such as iOS, the notification sound is selected from the voice files prepared in advance. Under the current specifications, the only sound that can be played when a push notification arrives is the notification sound. The sound of the voice message just received cannot be included in this notification sound.

The present invention discloses that the notification sound of the push notification is played and then the sound of the voice message is continuously played. As a result, users can see the content of incoming voice messages without having to open the voice message chat application.

Hereinafter, exemplary embodiments of the present invention will be described in detail with reference to the attached figures.

The present invention is not limited to the exemplary embodiments below, but may be implemented with various modifications within the scope of the present invention. In addition, the drawings used herein are for purposes of illustration and may not show actual dimensions.

Figure 1:
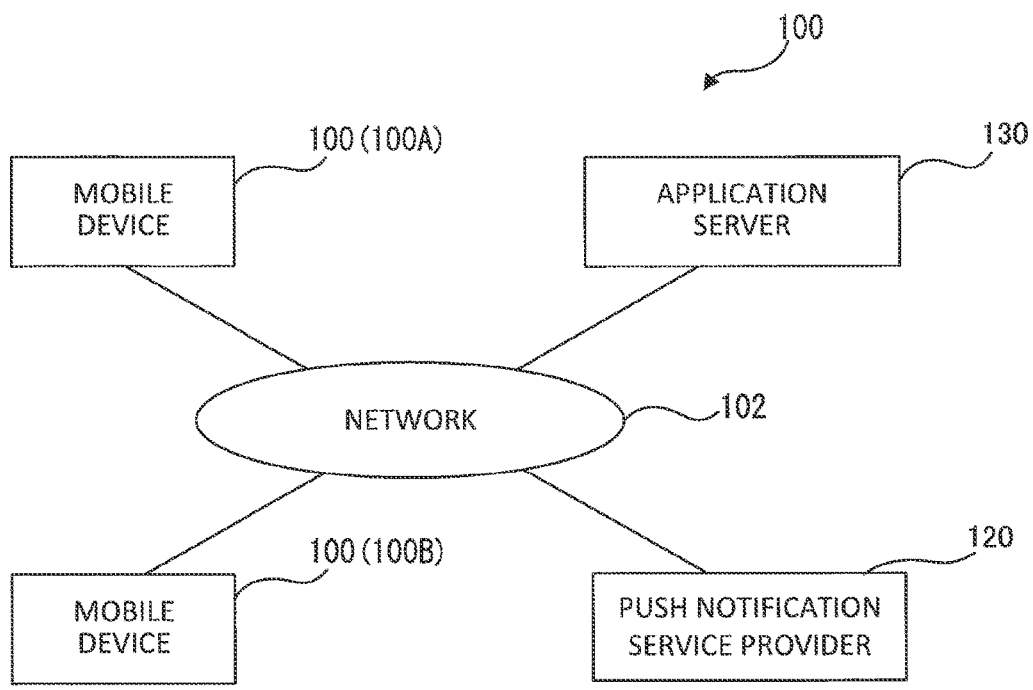
FIG. 1 illustrates a notification sound system 100, in accordance with an embodiment of the present invention.

FIG. 1 illustrates a notification sound system 100, in accordance with an embodiment of the present invention. The notification sound system 100 includes mobile devices 110 (110A, 110B, . . . ), a push notification service provider 120, and an application server 130 all connected via network 102. The setup in FIG. 1 represents an example embodiment configuration for the present invention, and is not limited to the depicted setup in order to derive benefit from the present invention.

Figure 2:
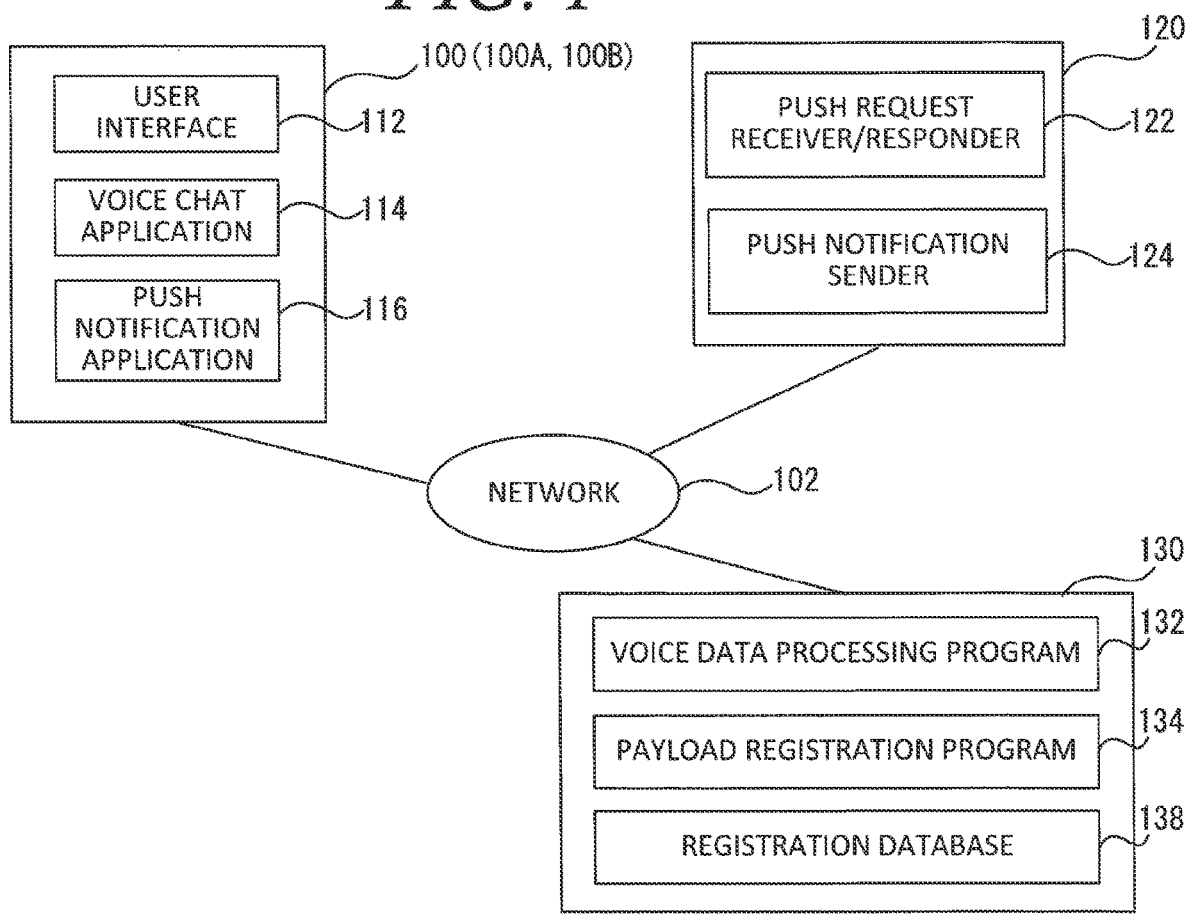
FIG. 2 is a function block diagram illustrating a mobile device 110, a push notification service provider 120 and an application server 130, following an embodiment of the present invention.

In the example embodiment, the mobile device 110 (110A, 110B) contains a user interface 112, a voice chat application 114, and a push notification application 116 as depicted and described in further detail below with reference to FIG. 2. In various embodiments, mobile device 110 (110A, 110B) may be a laptop computer, tablet computer, netbook computer, personal computer (PC), a desktop computer, a personal digital assistant (PDA), a smartphone, or any programmable electronic device capable of communicating with the push notification service provider 120 and the application server 130 via the network 102. The mobile device 110 (110A, 110B) may include internal and external hardware components, as depicted and described in further detail below with reference to FIG. 4. In other embodiments, the mobile device 110 (110A, 110B) may be implemented in a cloud computing environment. The mobile device 110 (110A, 110B) may also have wireless connectivity capabilities allowing for communication with the push notification service provider 120, the application server 130, and other computers, devices, or servers over the network 102.

In the example embodiment, the mobile device 110 (110A, 110B) includes the user interface 112, which is a computer program that allows a user to interact with the mobile device 110 and other connected devices via the network 102. For example, the user interface 112 may be a graphical user interface (GUI). In addition to comprising a computer program, the user interface 112 may be connectively coupled to hardware components, such as those depicted in FIG. 4, for receiving user input. In the example embodiment, the user interface 112 is implemented via a web browser; however, in other embodiments, the user interface 112 may be implemented via a different program capable of receiving user interaction and communicating with other devices.

In the example embodiment, the voice chat application 114 is a computer program, on the mobile device 110 (110A, 110B), that is capable of sending push notifications to other mobile devices 110, and receiving push notifications to be sent to the other mobile devices 110, which are registered with the push notification service provider 120. In one embodiment, the voice chat application 114 stores voice data input by a microphone 143a of the mobile device 110 in a storage 145 as depicted and described in further detail below with reference to FIG. 4. Then, it performs voice recognition (Speech-to-Text process) to create text data based on the voice data. Further, the voice chat application 114 uploads the voice data to application server 130. The voice chat application 114 also creates a URI acquired from the application server 130 and text data as a voice message and sends the voice message to the application server 130.

In the example embodiment, the application server 130 contains voice data processing program 132, payload registration program 134, and registration database 138 as depicted and described in further detail below with reference to FIG. 2. The application server 130 may be a laptop computer, tablet computer, netbook computer, personal computer (PC), a desktop computer, a personal digital assistant (PDA), a smartphone, or any programmable electronic device capable of communicating with mobile device 110 and the push notification service provider 120 via the network 102. In the exemplary embodiment, the application server 130 is implemented in a cloud computing environment and may also have wireless connectivity capabilities allowing for communication with the mobile device 110, the push notification service provider 120, and other computers or servers over the network 102. In other embodiments, the application server 130 may include internal and external hardware components, as depicted and described in further detail below with reference to FIG. 5. While the application server 130 is shown as a single device, in other embodiments, the application server 120 may be comprised of a cluster or plurality of computing devices, working together or working separately.

In the example embodiment, the voice data processing program 132 of the application server 130 stores voice data in the registration database 138 when the voice data processing program 132 receives the voice data from the voice chat application 114. Then, the voice data processing program 132 issues a downloadable URI identifying the stored voice data to the voice chat application 114. When the payload registration program 134 of the application server 130 receives a voice message from the voice chat application 114, the payload registration program 134 acquires the URI and the text data in the parameters of the voice message. The payload registration program 134 registers the acquired URI and the text data in the payload of the push notification service provider 120. After payload registration is completed, the program 134 requests the push notification service provider 120 to send a push notification addressed to the designated mobile device 110.

In the example embodiment, the push notification service provider 120 includes push request receiver/responder 122 and push notification sender 124 as depicted and described in further detail below with reference to FIG. 2. The push notification service provider 120 may be a laptop computer, tablet computer, netbook computer, personal computer (PC), a desktop computer, a personal digital assistant (PDA), a smartphone, a server, or any programmable electronic device capable of communicating with the mobile device 110 and the application server 130 via the network 102. The push notification service provider 120 may be implemented in a cloud computing environment. The push notification service provider 120 may also have wireless connectivity capabilities allowing it to communicate with the mobile device 110, the application server 130, and other computers or servers over the network 102. While the push notification service provider 120 is shown as a single device, in other embodiments, the push notification service provider 120 may be comprised of a cluster or plurality of computing devices, working together or working separately.

In the exemplary embodiment, the push notification service provider 120 acts as the intermediary between the application server 130 and the mobile device 110. Push requests are transmitted to the push notification service provider 120 by the application server 130, and in turn pushed to the push notification application 116 contained within the mobile device 110. Different push notification service providers 120 exist based on different requirements of operating systems on various mobile devices 110. In the exemplary embodiment, mobile devices 110 used in this system are registered with the push notification service provider 120 in advance.

In the exemplary embodiment, the push notification sender 124 pushes, or transmits, the received push notification containing payload information to the designated mobile device 110 containing the push notification application 116. In exemplary embodiments, the push notification sender 124 is capable of queueing received push notifications, and transmitting them at designated days, times, or intervals. Alternatively, the push notification sender 124 is capable of pushing, or transmitting, received push notifications to the designated mobile device 110 as soon as they are received.

In an exemplary embodiment, once the push notification reaches the mobile device 110, the mobile device 110 reproduces a push notification sound notifying the user that a push notification has arrived, and displays the text data included in the voice message on a display screen. However, in the embodiment of the present invention, the push notification sound includes not only the generally used notification sound but also the voice data input in the voice chat application 114 on the transmitting side.

Generally, sound data used as the push notification sound is prepared in advance in the OS, but when another sound data is to be used as the push notification sound, it is necessary to store the sound data in the voice chat application 114 and then upload it to an ASP (Application Service Provider) such as the App Store. Therefore, in order to change the push notification sound once uploaded, it is necessary to resubmit the voice chat application to the ASP such as the App Store. That is, it is not assumed that a different sound that has not been uploaded is reproduced as the push notification sound each time the push notification is made. Further, in the present invention, the process to be executed when the push notification is received is performed by the push notification application 116, and the push notification application 116 is realized by an extended function called the App Extension. Since such an extended function operates independently of the voice chat app application 114 itself, it is not possible to access the data area of the voice chat app application 114 itself. Moreover, it is not possible to create commands that can be activated without a user operation, such as automatic playback of voice. As described above, with the conventional technology, it is not possible to reproduce the voice data input by the voice chat application 114 as the push notification sound. Therefore, the present invention realizes the method for reproducing the voice data of the voice chat application 114 as the push notification sound each time the push notification is made, as follows.

The OS uses a default push notification sound if the push notification sound is not designated, but uses a specified push notification sound if the push notification sound is designated. When designating such a specific push notification sound, it is essential that an audio file is stored in a predetermined location in the voice chat application in advance. In other words, when designating the specific push notification sound, it is necessary to designate the predetermined location where the audio file of the push notification sound is located, and also designate the audio file name. However, as described above, the process to be executed when the push notification is received is performed by the extension function called the push notification application 116 (App Extension), which is a process different from the voice chat application 114, and therefore the predetermined location used in the voice chat application. 114 cannot be accessed from the push notification application 116 (App Extension). In an exemplary embodiment, therefore, for example, using the App Groups function of iOS, a shared folder is created as a storage area that can be accessed by both the process of reproducing by the voice chat application 114 and the process of push notification by the push notification application 116 (App Extension). The push notification application 116 (App Extension) stores a specific audio file created as follows in this shared storage area, and requests the system (OS) to reproduce the specific audio file name.

In an exemplary embodiment, the specific audio file is created by the push notification application 116 (App Extension) as follows. The push notification application 116 (App Extension) performs the following processing in a short time (for example, 30 seconds) between receiving the push notification and actually expressing the notification. First, the push notification application 116 (App Extension) analyzes the payload of the received push notification, acquires the destination URI information of the voice data, and downloads the voice data from the destination URI to the shared storage area. Next, the push notification application 116 (App Extension) combines a pre-saved push notification sound with the downloaded voice data in the shared storage area to create an audio file for the designated audio file. The pre-saved push notification sound selected at this time may be the default push notification sound or the push notification sound set by the user. It is also possible to set a different push notification sound for each sender of a voice message.

The push notification application 116 (App Extension) stores the designated audio file in the shared storage area and requests the OS to reproduce the designated audio file. In the OS, the requested audio file is reproduced as a push notification sound and the text data in the voice message is displayed on the screen. As a result, since the audio file includes the pre-saved push notification sound and the voice data, after the pre-saved push notification sound is reproduced, the voice data input by the voice chat application 114 is reproduced as the push notification sound. Therefore, the user can hear the voice data as the push notification sound without launching the voice chat application 114. Also, instead of reproducing the voice data suddenly, the pre-saved push notification sound is also reproduced before the voice data, so that the user can be aware that it is a push notification for the voice chat application 114.

In the example embodiment, the network 102 is a communication channel capable of transferring data between connected devices and may be a telecommunications network used to facilitate telephone calls between two or more parties comprising a landline network, a wireless network, a closed network, a satellite network, or any combination thereof. In another embodiment, the network 102 may be the Internet, representing a worldwide collection of networks and gateways to support communications between devices connected to the Internet. In this other embodiment, the network 102 may include, for example, wired, wireless, or fiber optic connections which may be implemented as an intranet network, a local area network (LAN), a wide area network (WAN), or any combination thereof. In further embodiments, the network 102 may be a Bluetooth network, a WiFi network, or a combination thereof. In general, the network 102 can be any combination of connections and protocols that will support communications between the mobile device 110, the push notification service provider 120, and the application server 130.

Figure 3:
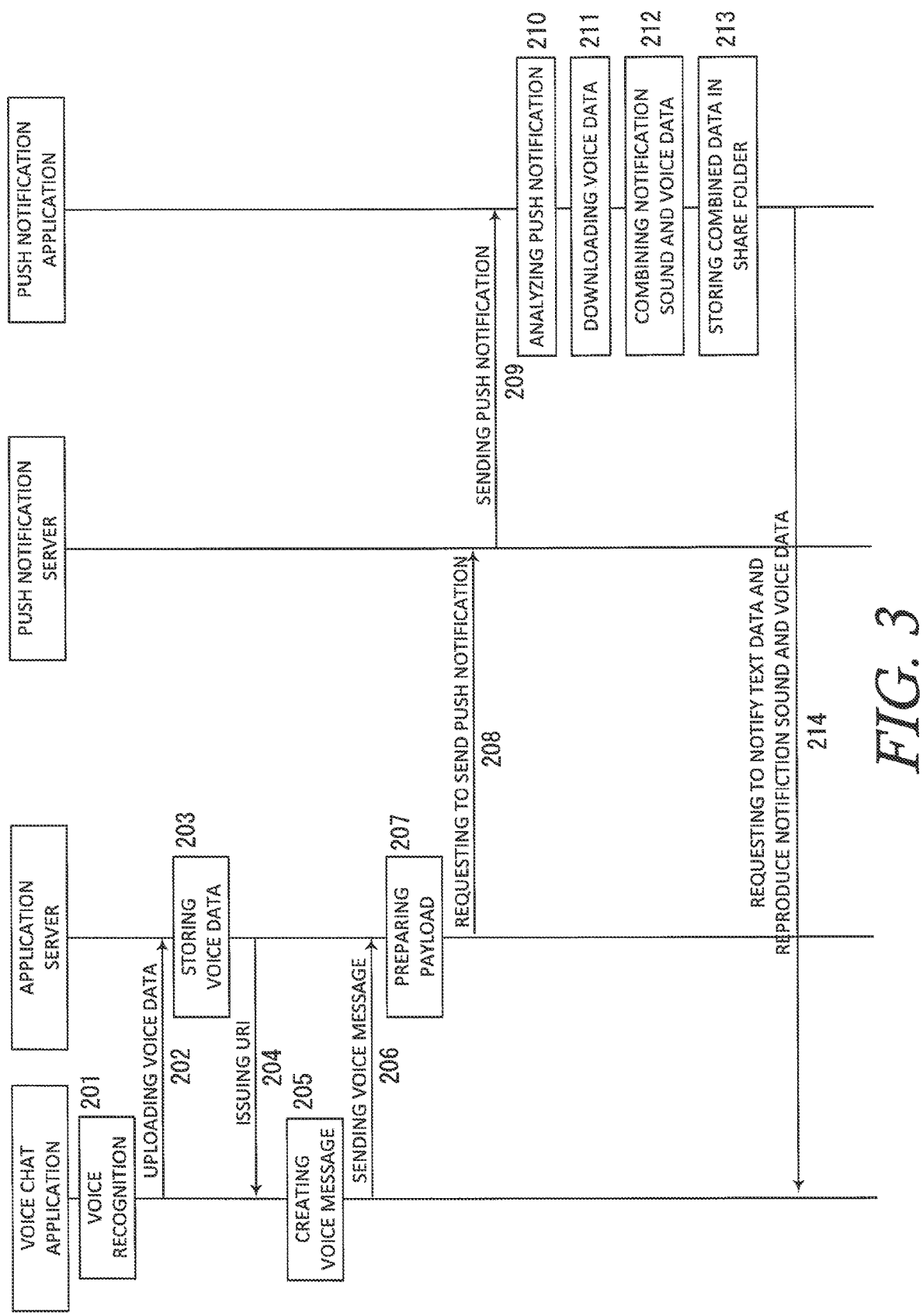
FIG. 3 is a flowchart illustrating the operation of the reproduction of a voice message in the notification sound system 100, in accordance with an embodiment of the present invention.

FIG. 3 is a flowchart depicting operational steps of a method for implementing the reproduction of a voice message when the voice message arrives, according to an embodiment of the present invention.

Referring now to FIGS. 1-5, when voice data input by a microphone 143a of mobile device 110 (110A) is stored in the storage 145, the voice chat application 114 performs voice recognition (Speech-to-Text process) to create text data based on the voice data (step 201). Then, the voice chat application 114 uploads the voice data to the application server 130 (step 202). The voice data processing program 132 of the application server 130 stores the voice data in the registration database 138 when the voice data processing program 132 receives the voice data from the voice chat application 114 (step 203). Then, the voice data processing program 132 issues a downloadable URI identifying the stored voice data to the voice chat application 114 (step 204). The voice chat application 114 creates a voice message combining the URI acquired from the application server 130 and the text data (step 205). The voice chat application 114 sends the voice message to application server 130 (step 206).

With continued reference to FIGS. 1-5, when the payload registration program 134 of the application server 130 receives a voice message from the voice chat application 114, the payload registration program 134 acquires the URI and the text data in the parameters of the voice message (step 207). The payload registration program 134 registers the acquired URI and text data in the payload of the push notification service provider 120 (step 207). After payload registration is completed, the payload registration program 134 requests the push notification service provider 120 to send a push notification addressed to the designated mobile device 110 (110B) (step 208).

With continued reference to FIGS. 1-5, the push notification sender 124 pushes, or transmits, the received push notification containing the payload information to the designated mobile device 110 (110B) containing the push notification application 116 (step 209). Once push notification reaches the push notification application 116 running on the mobile device 110 (110B), the push notification application 116 analyzes the payload of the received push notification and acquires destination URI information of the voice data (step 210). The push notification application 116 downloads the voice data from the destination URI (step 211). The push notification application 116 combines a notification sound with the beginning of the downloaded voice data to process it into a sound that a user can easily recognize as a notification (step 212).

With continued reference to FIGS. 1-5, since the push notification applicator 116 on the transmitting side intentionally designates a notification sound that does not exist in the default folder, the push notification applicator 116 on the receiving side stores the downloaded voice data in a shared folder (step 213). Then, the push notification application 116 combines the notification sound that a user designates with the beginning of the downloaded voice data (step 213). Then, the push notification application 116 sets the combined voice data recognized as the notification sound and the text data of the notification message and requests the mobile device 110 (110B) to notify the text data, and reproduce the notification sound and the voice data (step 214). As a result, the notification sound and voice message will be reproduced so that a user can know the content of the voice message without launching the voice chat application 114.

Figure 4:
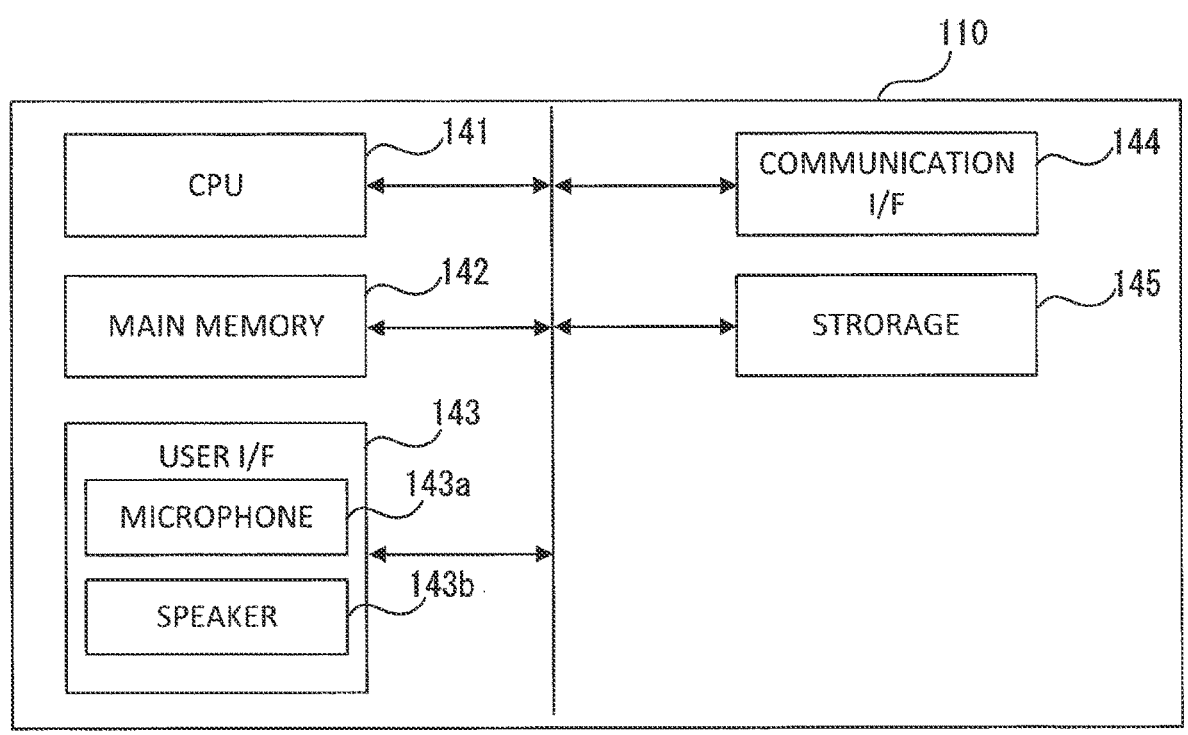
FIG. 4 is a diagram graphically illustrating the hardware components of the mobile device 100 of FIG. 1, in accordance with an embodiment of the present invention.

FIG. 4 is a diagram graphically illustrating the hardware components of the mobile device 110 (110A, 110B) according to an embodiment of the invention. As illustrated in FIG. 4, the mobile device 110 according to an embodiment may be any information processing device that may display on a web browser a web page of a web site and include an executing environment for executing applications. As an example of such information processing device may include personal computers, smartphones, tablet terminals, wearable devices, and game-dedicated terminals. It should be appreciated that FIG. 4 provides only an illustration of one implementation and does not imply any limitations with regard to environments in which different embodiments may be implemented. Many modifications to the depicted environment may be made.

As illustrated in FIG. 4, the mobile device 110 may be configured as a typical mobile computer device that includes a central processing unit (CPU) (computer processor) 141, a main memory 142, a user interface (I/F) 143, a communication I/F 144, and storage 145, and these components may be electrically interconnected via a bus 146.

The CPU 31 may load an operating system and various other programs into the main memory 142 from the storage 145, and may execute commands included in installed programs. The main memory 142 may be used to store a program to be executed by the CPU 141, and may be formed of, for example, a dynamic random access memory (DRAM) or the like.

The user I/F 143 may include, for example, an information input device such as a touch panel, a keyboard, a button, and a mouse for accepting an input from a user, and an information output device such as a liquid crystal display for outputting calculation results of the CPU 141. The user I/F 143 may include a typical microphone 143a (an audio input unit) into which voice/sound is input and the input voice/sound is converted to an electric signal, and a typical speaker (an audio output unit) 143b that converts the electric signal to voice/sound and outputs it. The communication I/F 144 may be implemented as hardware, firmware, or communication software such as a transmission control protocol/Internet protocol (TCP/IP) driver or a point-to-point protocol (PPP) driver, or a combination thereof, and may be configured to be able to communicate with the push notification service provider 120 and the application server 130 via the communication network such as the Internet.

The storage 145 may comprise, for example, a magnetic disk drive or a flash memory and store various programs such as an operating system. The storage 145 may also store various applications received from the push notification service provider 120, the application server 130 and the like.

Figure 5:
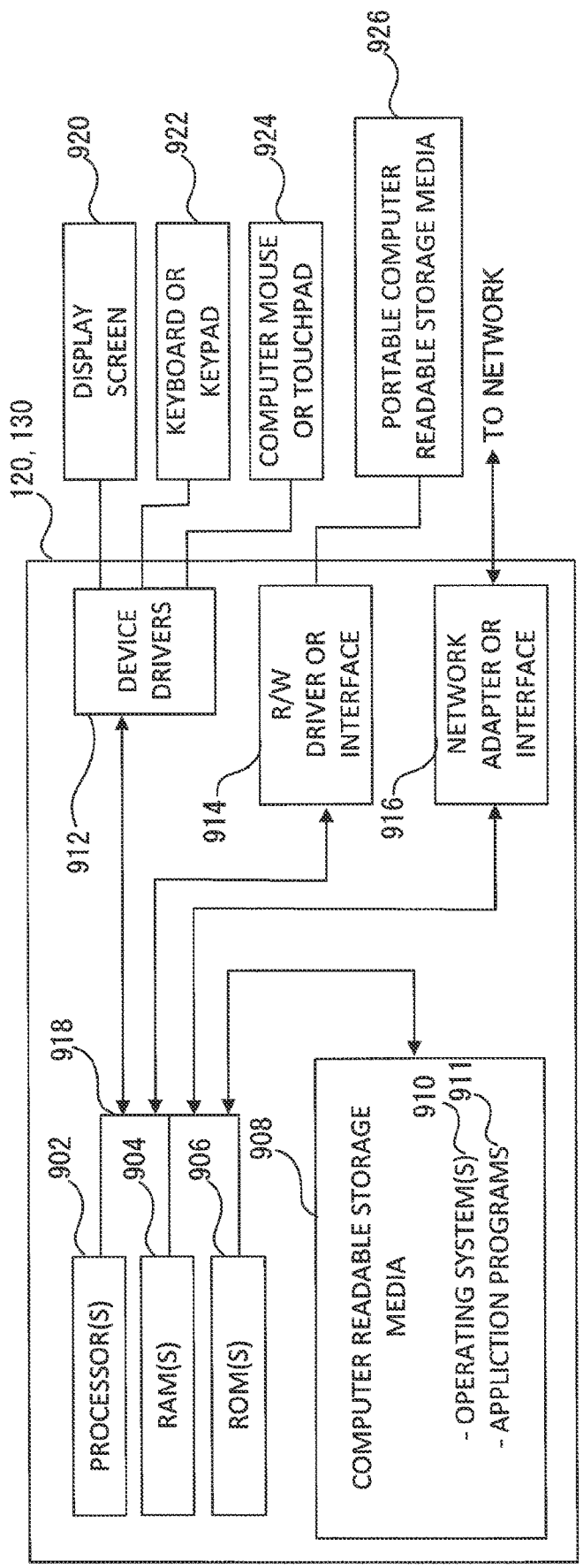
FIG. 5 is a diagram graphically illustrating the hardware components of the push notification service provider 120 and the application server 130 of FIG. 1, in accordance with an embodiment of the present invention.

FIG. 5 is a diagram graphically illustrating the hardware components of the push notification service provider 120, or the application server 130, as shown in FIG. 1, in accordance with an embodiment of the present invention. It should be appreciated that FIG. 4 provides only an illustration of one implementation and does not imply any limitations with regard the environments in which different embodiments may be implemented. Many modifications to the depicted environment may be made.

The push notification service provider 120 or the application server 130 may include one or more processors 902, one or more computer-readable RAMs 904, one or more computer-readable ROMs 906, one or more computer-readable storage media 908, device drivers 912, a read/write drive or interface 914, network adapter or interface 916, all interconnected over a communications fabric 918. The communications fabric 918 may be implemented with any architecture designed for passing data and/or control information between processors (such as microprocessors, communications and network processors, etc.), system memory, peripheral devices, and any other hardware components within a system.

One or more operating systems 910 and one or more application programs 911, such as the push notification template program 132, may be stored on one or more of the computer-readable storage media 908 for execution by one or more of the processors 902 via one or more of the respective RAMs 904 (which typically include cache memory). In the illustrated embodiment, each of the computer-readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The application backend server 120 may also include a R/W drive or interface 914 to read from and write to one or more portable computer-readable storage media 926. The application programs 911 on the application server 120 may be stored on one or more of the portable computer-readable storage media 926, read via the respective R/W drive or interface 914 and loaded into the respective computer-readable storage media 908.

The push notification service provider 120 or the application server 120 may also include a network adapter or interface 916, such as a TCP/IP adapter card or wireless communication adapter (such as a 4G wireless communication adapter using OFDMA technology). Application programs 911 on the push notification service provider 120 or the application server 130 may be downloaded to the computing device from an external computer or external storage device via a network (for example, the Internet, a local area network or other wide area network or wireless network) and the network adapter or interface 916. From the network adapter or interface 916, the programs may be loaded onto computer-readable storage media 908. The network may comprise copper wires, optical fibers, wireless transmission, routers, firewalls, switches, gateway computers and/or edge servers.

The push notification service provider 120 or the application server 130 may also include a display screen 920, a keyboard or keypad 922, and a computer mouse or touchpad 924. Device drivers 912 interface to the display screen 920 for imaging, to keyboard or keypad 922, to a computer mouse or touchpad 924, and/or to the display screen 920 for pressure sensing of alphanumeric character entry and user selections. The device drivers 912, the R/W drive or interface 914, and the network adapter or interface 916 may comprise hardware and software (stored on computer-readable storage media 908 and/or ROM 906).

In the above-described embodiment, an example in which voice data is input in the voice chat application 114, and the voice data and the text data arrive as a voice message has been described. However, in an alternative embodiment, the present invention is applicable even when there is no voice data and only a text message arrives. In this case, it is also possible to convert the text message into a voice message by a text-to-speech function, store the converted voice message in the shared storage area, and reproduce it as the push notification sound. The process of converting the text message into a voice message by the text-to-speech function may be performed by the mobile device 110 or the application server 130. Further, when a moving image is posted in the voice chat application 114, it is also possible to take out the audio portion of the moving image and reproduce the audio portion as the push notification sound. The process of taking out the and portion may be performed by the mobile device 110 or the application server 130.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or another device to cause a series of operational steps to be performed on the computer, other programmable apparatus or another device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for processing a sound of a voice message associated with a push notification in a voice-based application on a user device, comprising the steps of:
   creating a shared storage area that is different from a default storage area where at least one notification sound is stored in advance when the push notification indicating the arrival of the voice message reaches;
   downloading voice data of the voice message;
   combining the notification sound with the downloaded voice data;
   storing the combined notification sound and voice data in the shared storage area; and
   requesting the user device to reproduce the combined notification sound and voice data stored in the shared storage area.

2. The computer-implemented method of claim 1, wherein the method further comprises:
creating text data based on voice data inputted in the user device by performing a voice recognition process;
uploading the voice data to an application server to acquire a URI of the voice data;
creating a voice message combining the URI acquired from the application server and the text data; and
sending the voice message to the application server.

3. The computer-implemented method of claim 2, wherein the method further comprises:
registering the URI and the text data in the payload of a push notification service provider by the application server;
sending the payload to the push notification service provider by the application server; and
requesting the push notification service provider to send a push notification addressed to a designated user device by the application server.

4. The computer-implemented method of claim 3, wherein the method further comprises:
analyzing the payload to acquire the URI of the voice data by the designated user device,
wherein downloading voice data of the voice message downloads the voice data based on the URI by the designated user device,
wherein combining the notification sound with the downloaded voice data combines the notification sound with the beginning of the downloaded voice data.

5. The computer-implemented method of claim 4, wherein
the shared storage area is an area that can be accessed by both analyzing payload and reproducing the combined notification sound and voice data.

6. A computer program product, comprising a non-transitory tangible storage device having program code embodied therewith, the program code executable by a processor of a computer to perform a method, the method comprising the steps of:
creating a shared storage area that is different from a default storage area where at least one notification sound is stored in advance, when the push notification indicating the arrival of the voice message reaches;
downloading voice data of the voice message;
combining the notification sound with the downloaded voice data;
storing the combined notification sound and voice data in the shared storage area; and
requesting the user device to reproduce the combined notification sound and voice data stored in the shared storage area.

7. The computer program product of claim 6, wherein the method further comprises:
creating text data based on voice data inputted in the user device by performing a voice recognition process;
uploading the voice data to an application server to acquire a URI of the voice data;
creating a voice message combining the URI acquired from the application server and the text data; and
sending the voice message to the application server.

8. The computer program product of claim 7, wherein the method further comprises:
registering the URI and the text data in the payload of a push notification service provider by the application server;
sending the payload to the push notification service provider by the application server; and
requesting the push notification service provider to send a push notification addressed to a designated user device by the application server.

9. The computer program product of claim 8, wherein the method further comprises:
analyzing the payload to acquire the URI of the voice data by the designated user device,
wherein downloading voice data of the voice message downloads the voice data based on the URI by the designated user device,
wherein combining the notification sound with the downloaded voice data combines the notification sound with the beginning of the downloaded voice data.

10. The computer program product of claim 9, wherein
the shared storage area is an area that can be accessed by both the process of analyzing payload and the process of reproducing the combined notification sound and voice data.

11. A computer system, comprising:
one or more computing devices each having one or more processors and one or more tangible storage devices; and a program embodied on at least one of the one or more storage devices, the program having a plurality of program instructions for execution by the one or more processors, the program instructions comprising instructions for:
downloading voice data of the voice message;
combining the notification sound with the downloaded voice data;
storing the combined notification sound and voice data in the shared storage area; and
requesting the user device to reproduce the combined notification sound and voice data stored in the shared storage area.

12. The computer system of claim 11, wherein the program instructions further comprise instructions for:
creating text data based on voice data inputted in the user device by performing a voice recognition process;
uploading the voice data to an application server to acquire a URI of the voice data;
creating a voice message combining the URI acquired from the application server and the text data; and
sending the voice message to the application server.

13. The computer system of claim 12, wherein the program instructions further comprise instructions for:
registering the URI and the text data in the payload of a push notification service provider by the application server;
sending the payload to the push notification service provider by the application server;
requesting the push notification service provider to send a push notification addressed to a designated user device by the application server.

14. The computer system of claim 13, wherein the program instructions further comprise instructions for:
analyzing the payload to acquire the URI of the voice data by the designated user device,
wherein downloading voice data of the voice message downloads the voice data based on the URI by the designated user device,
wherein combining the notification sound with the downloaded voice data combines the notification sound with the beginning of the downloaded voice data.

15. The computer system of claim 14, wherein the shared storage area is an area that can be accessed by both the process of analyzing payload and the process of reproducing the combined notification sound and voice data.

\* \* \* \* \*